Nov. 2, 1954  F. KRIENEN  2,693,532
PULSE GENERATOR
Filed Oct. 19, 1951

INVENTOR
Frank Krienen
By Fred M Vogel
Agent

United States Patent Office 2,693,532
Patented Nov. 2, 1954

2,693,532

PULSE GENERATOR

Frank Krienen, Amsterdam, Netherlands, assignor to Hartford National Bank and Trust Company, Hartford, Conn., as trustee Application October 19, 1951, Serial No. 252,027

Claims priority, application Netherlands October 26, 1950

3 Claims. (Cl. 250—27)

This invention relates to pulse generators producing pulses of short duration relatively to their spacing in time, for use in radar apparatus or the like and comprising a pulse-forming line and a source of direct current for charging the latter, which source is connected by way of a charging choke and a high-frequency choke to the series-connection of a pulse-shaper and the load, a gas-filled switching tube each time ignited for the production of an impulse being connected in parallel with said series-connection.

As is known, such pulse generators employ a charging choke having a considerable value of, say, 50 to 400 h. in order to increase the efficiency and the voltage upon charging the pulse-forming line periodically.

We have found that in these pulse generators the life of the switching tube employed is shorter than might be expected in virtue of its load by the current pulses produced.

The present invention has for its object to mitigate this disadvantage or to avoid it.

According to the invention, in pulse generators of the type referred to in the preamble the oscillatory circuit constituted by the high-frequency choke and the parasitic capacity, which is connected in parallel thereto by way of the switching tube and mainly originates from the charging choke, is provided with a loss resistor and this preferably such as to damp the oscillatory circuit critically.

In order to avoid the incorporation of a loss resistor in the discharge circuit of the pulse-shaper, the loss resistor is preferably connected in parallel with the high-frequency choke.

Figure 1:
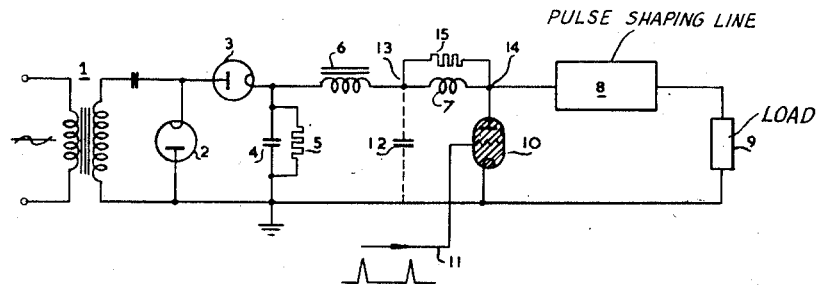
Figure 2:
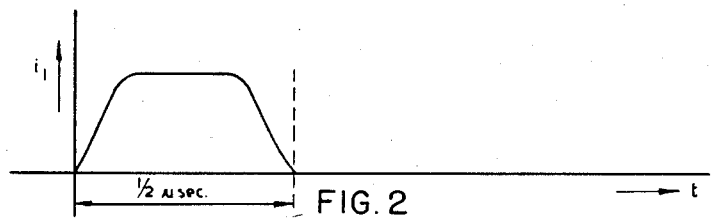
Figure 3:
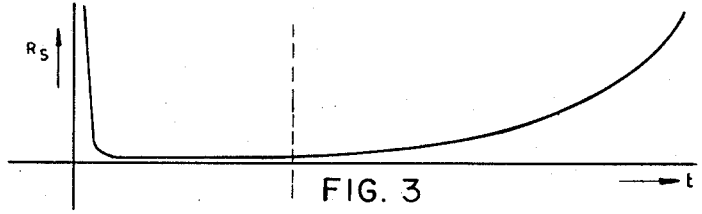
Figure 4:
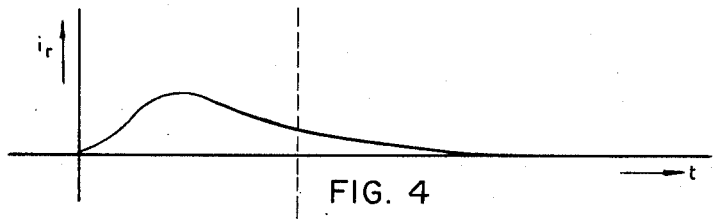

In order that the invention may readily be carried into effect, it will now be described in detail with reference to the accompanying drawing, given by way of example, in which Fig. 1 shows a circuit-arrangement of a pulse generator according to the invention, and Figs. 2, 3 and 4 show time diagrams for explaining the operation of the circuit-arrangement depicted in Fig. 1.

The pulse generator shown in Fig. 1 comprises a supply transformer 1 which is connected to a source of alternating voltage and the secondary of which is connected to a voltage doubling rectifier circuit-arrangement comprising two rectifying tubes 2, 3. The output circuit of the rectifier circuit-arrangement comprises a smoothing capacitor 4 bridged by a high ohmic protective resistor 5.

The non-earthed output terminal of the rectifier circuit-arrangement 2 to 5 is connected to a connecting terminal of a pulse forming line 8 by way of a charging choke 6 of, say, 90 h. and a high-frequency choke 7, the other connecting terminal of pulse-line 8 being earthed by way of a load impedance 9 consisting, for example, of a pulse transformer and a magnetron connected thereto. In parallel with the series-connection of the pulse-line 8 and the load 9 is connected a switching tube 10 having a gas or vapour filling and comprising a control-grid to which pulses each time igniting the switching tube for producing a pulse are supplied by way of lead 11. If the pulse-line 8 is charged and the switching tube 10 is made conductive by means of an ignition pulse, the pulse-line 8 discharges by way of load impedance 9 and switching tube 10, the discharge current pulse $i_1$ then produced varying as shown in the time diagram of Fig. 2. The duration of the impulse is determined by the delay of the pulse-line and may, for example, be 0.5 microsec.

It has been found that, in the circuit-arrangement so far described, each time the switching tube 10 ignites the power dissipated therein is higher than might be expected in virtue of the discharge current pulses of the pulse-shaper and may sometimes be as much as 50 to 80% higher. It has further been found that the additional dissipation in the switching tube 10 is due to excitation of an oscillatory circuit upon ignition of the switching tube, which circuit consists of the high-frequency choke 7 and the parasitic capacity, designated 12 in Fig. 1, of the charging choke 6, which parasitic capacity is actually connected in parallel thereto by way of switching tube 10. With the use of a pulse generator of usual size as shown in Fig. 1 for producing pulses of approximately 0.5 microsec., the tuning frequency of the said oscillatory circuit was found to be approximately 2 mc./s., the parasitic oscillations occuring therein exhibiting a considerable decrease in amplitude only upon termination of the current pulse supplied by the pulse-line. As soon, however, as the current pulse of the pulse-line is substantially terminated, the de-ionisation process in the switching tube 10 commences owing to which the internal resistance of the tube increases considerably. The said parasitic oscillations are damped by the power dissipated in the switching tube and bring about a considerable rise of the operating temperature of the switching tube, due to which the life of this tube is greatly reduced.

According to the invention the said disadvantage is avoided by incorporating a damping resistor in the oscillatory circuit consisting of the high-frequency choke 7 and the parasitic capacity 12 connected in parallel thereto by way of switching tube 10. It is vital that this damping resistor should not be incorporated in the discharging circuit of the pulse-line in order to prevent efficiency loss of the pulse-line. Accordingly, the damping resistor is connected preferably between the point 13 connecting the charging choke 6 and the high-frequency choke 7 on the one hand, and the point 14 connecting the high-frequency choke 7, switching tube 10 and pulse-shaper 8 on the other hand. The damping resistor may be connected between said two junction points 13 and 14 in series with the high-frequency choke 7, an additional resistor then being incorporated in the charging circuit of the pulse-shaper. Consequently, a damping resistor connected in parallel with the high-frequency choke 7 and designated 15 in Fig. 1 is preferably used.

The damping resistor is preferably so chosen as to attenuate the said oscillatory circuit in a critical manner. By giving the high-frequency choke 7 and the parasitic capacity 12 suitable values it is moreover advisable to choose the tuning frequency of the oscillatory circuit such that a half-cycle of this tuning frequency approximately corresponds to the duration of the pulses to be produced.

The advantages of the said proportioning readily appear from Figs. 3 and 4 in conjunction with Fig. 2.

Fig. 3 shows the variation of the internal resistance of switching tube 10 during and after a pulse supplied by the pulse-line 8. Immediately after ignition of switching tube 10, the internal resistance $R_s$ drops to a very low value of say, 1 to 2 ohms, and rapidly increases again by the end of the current pulse $i_1$ shown in Fig. 2.

Upon ignition of switching tube 10 a current $i_r$ is produced in the oscillatory circuit 7, 10, 12, which current varies as shown in Fig. 4 when choosing the aforesaid advantageous proportions. From Fig. 4 it appears that the maximum circulating current occurs during the time the switching tube has its minimum resistance and more particularly a resistance which is very low in comparison with the parallel resistor 15 employed for damping the circuit critically, so that the oscillatory energy will substantially be dissipated in the resistor 15 and not in switching tube 10 as before. In order to avoid excessive peak voltages during the envisaged dissipation of the circuit energy, this dissipation should take place as gradually as possible and for this reason the oscillatory circuit 7, 10, 12 is preferably tuned to approximately 1 mc./s. with a pulse duration of about 0.5 microsec.

In a practical circuit-arrangement as shown in Fig. 1, wherein the rectifier supplied a current of 100 ma. with an output voltage of 8 kv. for producing 1000 pulses per second having a duration of 0.5 microsec., approximately 30 w. were found to be dissipated in a thyratron used as a switching tube without application of the invention. With the use of the invention and a damping resistor connected in parallel with the high-frequency choke 7, the load of the thyratron was found to drop to about 18, and 12 w. were dissipated in the parallel resistor 15.

It will be evident that the invention may be used with advantage not only when employing a thyratron as a switching tube, but also with the use of other gas-filled switching tubes, for example of the trigatron-type.

What I claim is:

1. Apparatus for generating electric pulses and applying said pulses to a load, said apparatus comprising a source of direct current, a pulse-shaping line, a charging stroke, a high-frequency choke connected serially with said charging choke, means connecting said load in series with said pulse-shaping line across said source through said serially-connected chokes, a gaseous discharge switching tube connected across said serially-connected load and line, means intermittently igniting said tube to produce pulses for energizing said load, said charging choke having a parasitic capacity which is effectively connected across said high-frequency choke through said switching tube to constitute an oscillatory circuit, and a resistor connected across said high-frequency choke and having a value effecting critical damping of said oscillatory circuit.

2. Apparatus for generating electric pulses and applying said pulses to a load such as a magnetron, said apparatus comprising a source of direct current, a pulse-shaping line, a charging choke having a value exceeding 50 henries, a high-frequency choke connected serially with said charging choke, means connecting said load in series with said pulse-shaping line across said source through said serially-connected chokes, a gaseous discharge switching tube connected across said serially-connected load and line and provided with an ignition electrode, means coupled to said electrode for intermittently igniting said tube to produce pulses for energizing said load, said charging choke having a parasitic capacity which is effectively connected across said high-frequency choke through said switching tube to constitute an oscillatory circuit, and a resistor connected across said high-frequency choke and having a value relative to the frequency of said oscillatory circuit effecting critical damping of said oscillatory circuit.

3. Apparatus as set forth in claim 1, characterised in that the value of the high frequency choke in connection with the parasitic parallel capacity is chosen to be such that the tuning frequency of the oscillatory circuit thus formed is approximately equal to double the reciprocal value of the duration of the pulses to be produced.

References Cited in the file of this patent

UNITED STATES PATENTS

| Number | Name | Date |
|---|---|---|
| 2,394,389 | Lord | Feb. 5, 1946 |
| 2,405,069 | Tonks | July 30, 1946 |
| 2,405,070 | Tonks et al. | July 30, 1946 |